United States Patent
Lin

(10) Patent No.: US 12,298,821 B1
(45) Date of Patent: May 13, 2025

(54) MOLD ASSEMBLY FOR ASSEMBLING TOUCH MODULE IN HOUSING AND ASSEMBLING METHOD USING THE SAME

(71) Applicant: ASUSTEK COMPUTER INC., Taipei (TW)

(72) Inventor: Kuan-Yu Lin, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 18/601,354

(22) Filed: Mar. 11, 2024

(30) Foreign Application Priority Data

Nov. 13, 2023 (TW) .................................. 112143740

(51) Int. Cl.
*G06F 3/0354* (2013.01)
*G06F 1/16* (2006.01)

(52) U.S. Cl.
CPC .......... *G06F 1/169* (2013.01); *G06F 3/03547* (2013.01)

(58) Field of Classification Search
CPC .............................. G06F 3/03547; G06F 1/169
See application file for complete search history.

(56) References Cited

U.S. PATENT DOCUMENTS

2009/0160813 A1* 6/2009 Takashima .............. G06F 3/016
  345/173
2018/0199447 A1* 7/2018 Lin ..................... H05K 13/0465

FOREIGN PATENT DOCUMENTS

| CN | 105117053 B | 12/2015 |
| CN | 214604010 U | 11/2021 |
| CN | 219660012 U | 9/2023 |
| TW | 489700 U | 6/2002 |
| TW | 567939 U | 12/2003 |

* cited by examiner

*Primary Examiner* — Yuzhen Shen
(74) *Attorney, Agent, or Firm* — MUNCY, GEISSLER, OLDS & LOWE, P.C.

(57) ABSTRACT

A mold assembly for assembling a touch module in a housing is provided. The touch module comprises a carrier, a circuit board, and a touch film. The housing has an opening corresponding to the touch module, and there has a plurality of positioning elements and a plurality of securing elements around the opening. The mold assembly comprises a base, a first frame, and a second frame. The base has an upper surface with a concave corresponding to the carrier. The first frame is for detachably disposed on the first surface and has a first opening correspond to the circuit board. The second frame is for detachably disposed on the first surface and has a second opening corresponding to the touch film. An assembling method using the mold assembly is also provided.

9 Claims, 9 Drawing Sheets

MOLD ASSEMBLY FOR ASSEMBLING TOUCH MODULE IN HOUSING AND ASSEMBLING METHOD USING THE SAME

CROSS-REFERENCE TO RELATED APPLICATION

This application claims the priority benefit of Taiwan Application Serial No. 112143740, filed on Nov. 13, 2023. The entirety of the above-mentioned patent application is hereby incorporated by reference herein and made a part of the specification.

BACKGROUND OF THE INVENTION

Field of the Invention

The disclosure is related to a mold assembly for assembling a touch module in a housing and an assembling method using the same.

Description of the Related Art

A conventional touch module uses a plurality of independent mold assemblies to assemble a touch module, and then install the assembled touch module in a housing.

Because the mold assemblies used to assemble the touch module are independent, relative positions of members are prone to deviations during a process of assembling the touch module. Then, a conventional manner of positioning and installing the touch module by using a positioning column and a positioning hole needs to consider an assembly tolerance and leave a gap. This gap easily causes an assembly deviation. In addition, because the mold assemblies used to assemble the touch module are independent, when the deviation is found after assembly is performed, it is difficult to determine a source of the assembly deviation.

BRIEF SUMMARY OF THE INVENTION

The disclosure provides a mold assembly for assembling a touch module in a housing. The touch module includes a carrier, a circuit board, and a touch film. The housing includes an opening corresponding to the touch module, and a plurality of positioning elements and a plurality of securing elements is provided around the opening, for positioning and fixing the touch module. The mold assembly includes a base, a first frame, and a second frame. The base includes an upper surface. The upper surface includes a concave corresponding to the carrier. The first frame is detachably disposed on the upper surface and includes a first opening corresponding to the circuit board. The second frame is detachably disposed on the upper surface and includes a second opening corresponding to the touch film.

An assembling method, for assembling a touch module in a housing. The touch module includes a carrier, a circuit board, and a touch film. The housing includes an opening corresponding to the touch module, and a plurality of positioning elements and a plurality of securing elements is provided around the opening, for positioning and fixing the touch module. The assembling method includes: providing the foregoing mold assembly; placing the carrier in the concave; disposing the first frame on the upper surface, and assembling the circuit board on the carrier; removing the first frame from the base; disposing the second frame on the upper surface, and assembling the touch film on the circuit board to form the touch module; removing the second frame from the base; moving the base along with the touch module to the opening, and enabling the touch module to face the opening; positioning the base by using the positioning elements; and fixing the touch module to the housing by using the securing elements.

The mold assembly for assembling the touch module and the assembling method of the touch module by using the mold assembly provided in the disclosure are programs that use the same mold assembly to assemble the touch module and install the touch module in the housing. In this way, in addition to effectively reducing an assembly deviation, when the assembly deviation occurs, a reason of the deviation is also effectively determined, to correct the deviation.

DETAILED DESCRIPTION OF THE EMBODIMENTS

The following describes embodiments of the disclosure in detail with reference to the schematic diagrams. The advantages and features of the disclosure are clearer according to the following description and patent application scope. It is to be noted that the diagrams are in a very simplified form and use imprecise proportions, and are only used to conveniently and clearly assist in explaining the objective of the embodiments of the disclosure.

Figure 1:
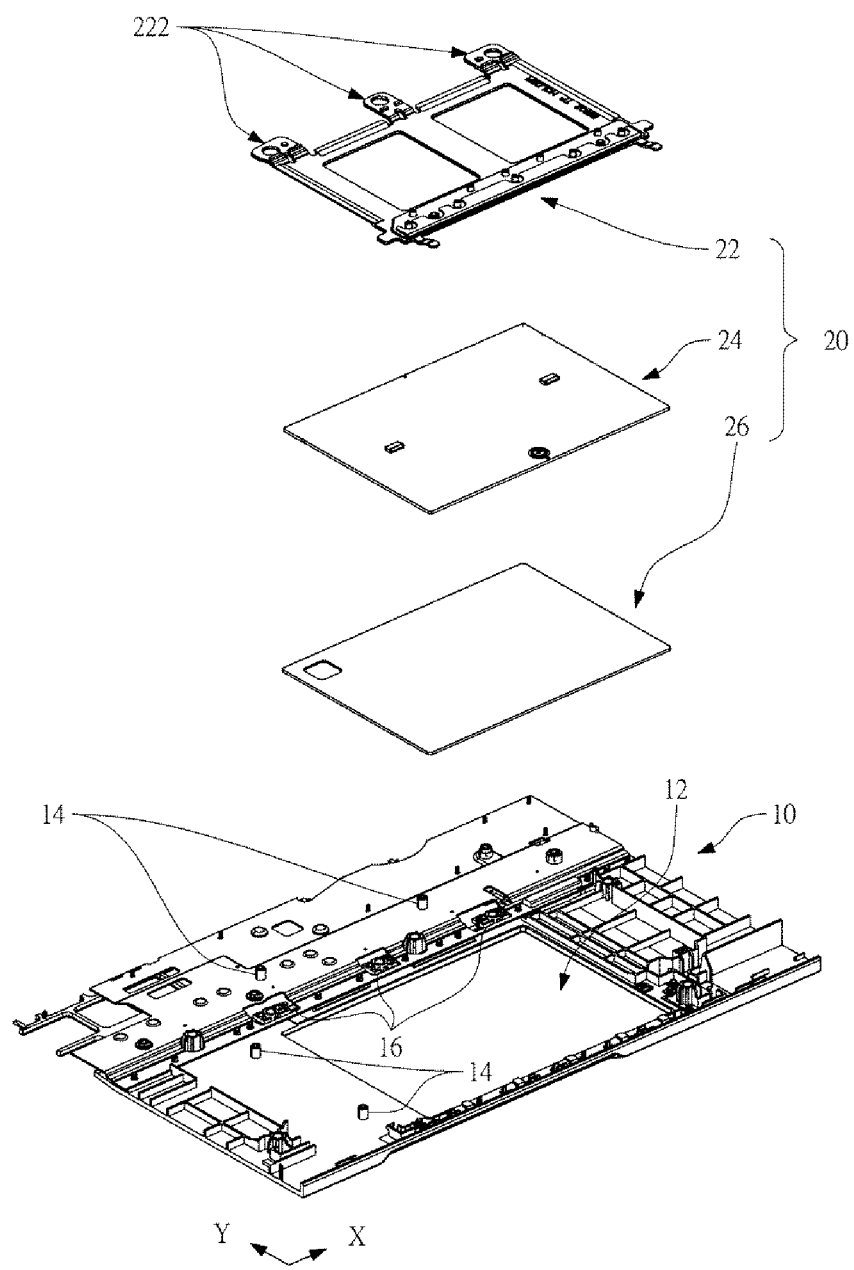
FIG. 1 shows a housing and a touch module to be assembled in the housing.
Figure 2:
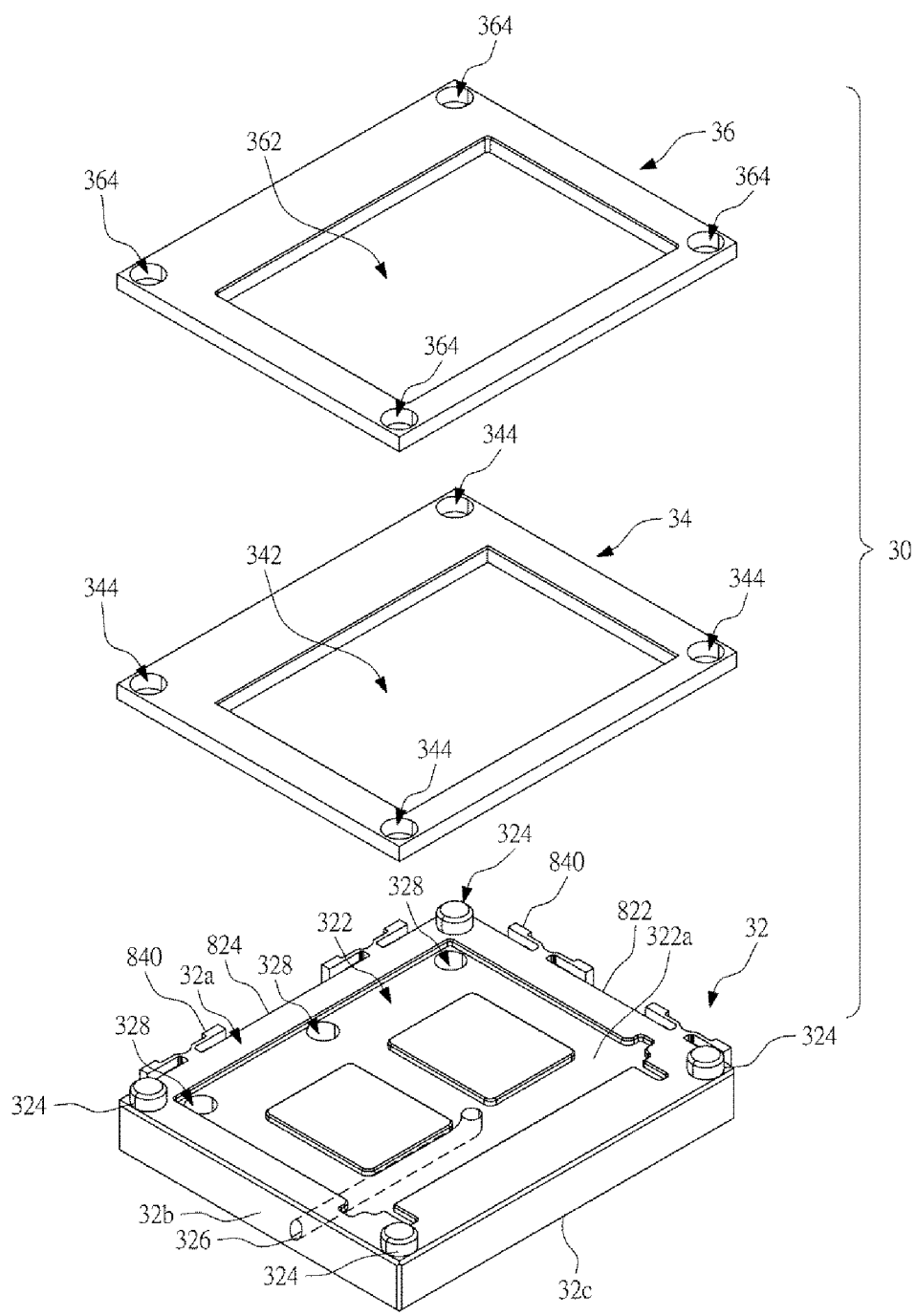
FIG. 2 is a schematic diagram of a mold assembly according to an embodiment of the disclosure.

FIG. 1 shows a housing 10 and a touch module 20 to be assembled in the housing 10. FIG. 2 is a schematic diagram of a mold assembly 30 according to an embodiment of the disclosure.

The disclosure provides the mold assembly 30 for assembling the touch module 20 in the housing 10. The touch module 20 includes a carrier 22, a circuit board 24, and a touch film 26 stacked in sequence. The housing 10 includes an opening 12 corresponding to the touch module 20. A plurality of positioning elements 14 and a plurality of securing elements 16 is provided around the opening 12, for positioning and fixing the touch module 20.

In an embodiment, the electronic device may be a notebook computer, and the housing 10 may be an upper cover of a system unit of the notebook computer, that is, the housing 10 on which a keyboard module is disposed. In the figure, an inner side of the housing 10 faces upward.

In an embodiment, the securing elements 16 are lock holes, and the carrier 22 includes a plurality of fixing holes 222. The fixing holes 222 are through holes, respectively corresponding to the securing elements 16 on the housing 10, and are used for fixing the touch module 20 to the opening 12 of the housing 10 in a securing manner.

In an embodiment, the positioning elements 14 are positioning columns for positioning the touch module 20 from an X direction and a Y direction in the figure. However, the disclosure is not limited to thereto, and other forms of positioning structures are also suitable for the disclosure. Further, in an embodiment, the foregoing securing elements 16 and positioning elements 14 are alternatively integrated into one entity. For example, a lock hole is provided on a positioning column to provide both positioning and fixing functions.

As shown in the figure, the mold assembly 30 mainly includes three independent parts. The three independent parts are a base 32, a first frame 34, and a second frame 36, respectively.

The base 32 includes an upper surface 32a. The upper surface 32a includes a concave 322. A shape and a size of the concave 322 correspond to the carrier 22 of the touch module 20. The first frame 34 includes a first opening 342. A shape and a size of the first opening 342 correspond to the circuit board 24. The second frame 36 includes a second opening 362. A shape and a size of the second opening 362 correspond to the touch film 26. In an embodiment, the size of the concave 322 is slightly larger than a size of the carrier 22, the size of the first opening 342 is slightly larger than a size of the circuit board 24, and the size of the second opening 362 is slightly larger than a size of the touch film 26, to facilitate a process of assembling the touch module 20. In an embodiment, both the first opening 342 and the second opening 362 are square openings, and the size of the first opening 342 is slightly smaller than that of the second opening 362, to ensure that the touch film 26 completely covers the circuit board 24.

The first frame 34 is detachably disposed on the upper surface 32a of the base 32, and space is formed in the concave 322 to accommodate the circuit board 24. The second frame 36 is detachably disposed on the upper surface 32a of the base 32, and space is formed in the concave 322 to accommodate the touch film 26. Specifically, a surrounding area of the upper surface 32a of the base 32 includes a plurality of base positioning elements 324. The first frame 34 includes a plurality of first frame positioning elements 344, respectively corresponding to the base positioning elements 324, for detachably assembling the first frame 34 on the upper surface 32a. The second frame 36 includes a plurality of second frame positioning elements 364, respectively corresponding to the base positioning elements 324, for detachably assembling the second frame 36 on the upper surface 32a.

In an embodiment, the foregoing base positioning elements 324 are disposed at corner positions of the upper surface 32a of the base 32. The first frame positioning elements 344 and the second frame positioning elements 364 are respectively disposed at corner positions of the first frame 34 and the second frame 36. In an embodiment, each base positioning element 324 is a protruding block, and the first frame positioning elements 344 and the second frame positioning elements 364 are all positioning holes. The mold assembly 30 enables the first frame 34 and the second frame 36 to be optionally assembled on the base 32 in a cooperation manner of the protruding blocks and the positioning holes. However, the disclosure is not limited to thereto. In another embodiment, each base positioning element 324 is also a positioning hole, and the first frame positioning elements 344 and the second frame positioning elements 364 are corresponding protruding blocks, so that the first frame 34 and the second frame 36 are optionally assembled on the base 32.

In an embodiment, as shown by a dashed line in the figure, an air extraction flow channel 326 is provided inside the base 32. The air extraction flow channel 326 extends from a side 32b of the base 32 or a lower surface 32c relative to the upper surface 32a to a bottom surface 322a of the concave 322, to form a vacuum zone between the carrier 22 and the concave 322 for attaching the touch module 20, to avoid the touch module 20 being separated from the base 32. That the air extraction flow channel 326 in the figure extends from the side 32b of the base 32 into the concave 322 is used as an example.

In an embodiment, the concave 322 of the base 32 includes a plurality of holes 328. Positions of the holes 328 are aligned with the fixing holes 222 on the carrier 22, that is, corresponding to the securing elements 16 on the housing 10. By providing the holes 328, a manufacturer locks and fixes the touch module 20 to the housing 10 without removing the base 32 from the touch module 20 during installation of the touch module 20.

FIG. 3 to FIG. 7 show an embodiment of an assembling method according to the disclosure. The assembling method is used for assembling the touch module 20 shown in FIG. 1 to a housing 10. The touch module 20 includes a carrier 22, a circuit board 24, and a touch film 26. The housing 10 includes an opening 12 corresponding to the touch module 20, and a plurality of positioning elements 14 and securing elements 16 is provided around the opening 12, for positioning and fixing the touch module 20. The assembling method uses the mold assembly 30 in FIG. 2 to perform an assembly process. Details are as follows.

Figure 3:
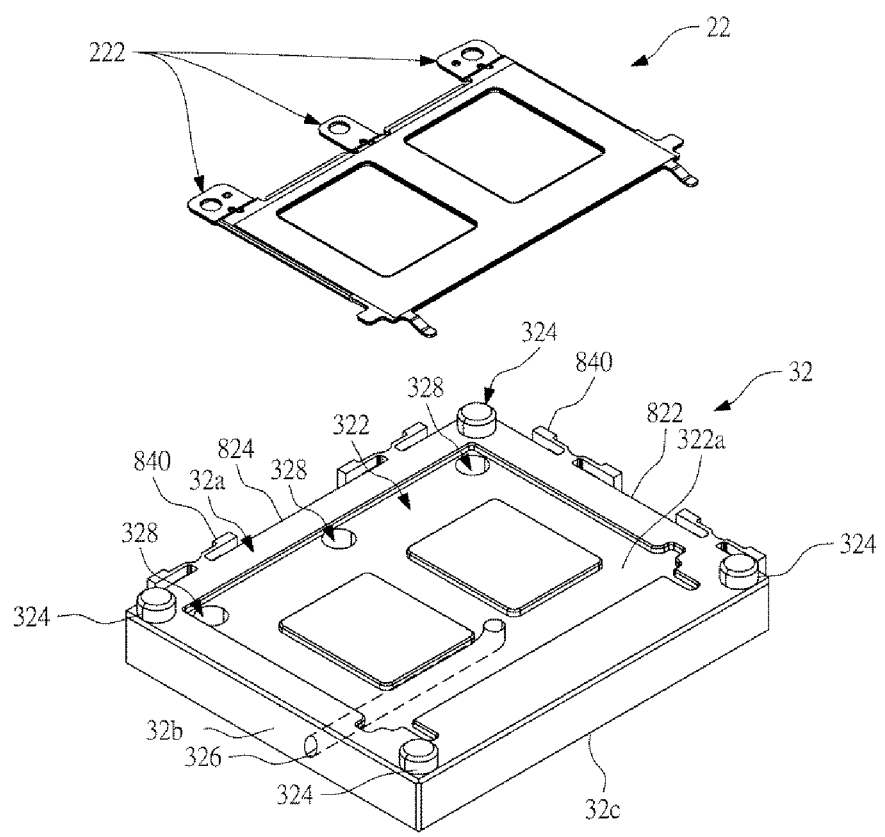
FIG. 3 to FIG. 7 show an embodiment of an assembling method of a touch module according to the disclosure.

First, as shown in FIG. 3, the mold assembly 30 shown in FIG. 2 is provided, and the carrier 22 is placed in the concave 322 of the base 32.

Figure 4:
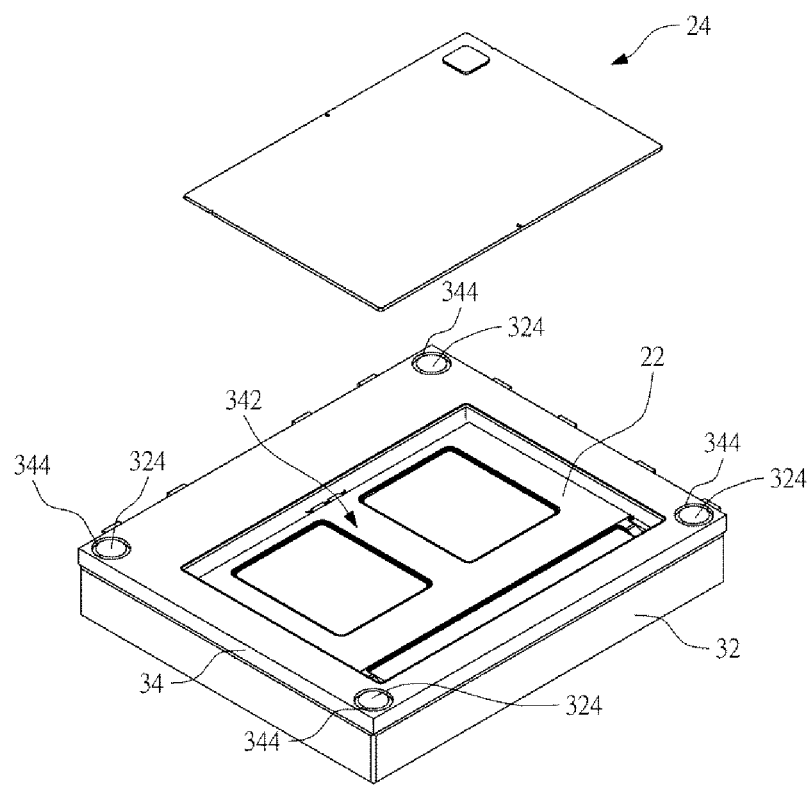

Subsequently, as shown in FIG. 4, the first frame 34 is disposed on the upper surface 32a of the carrier 22, and the circuit board 24 is assembled on the carrier 22.

Figure 5:
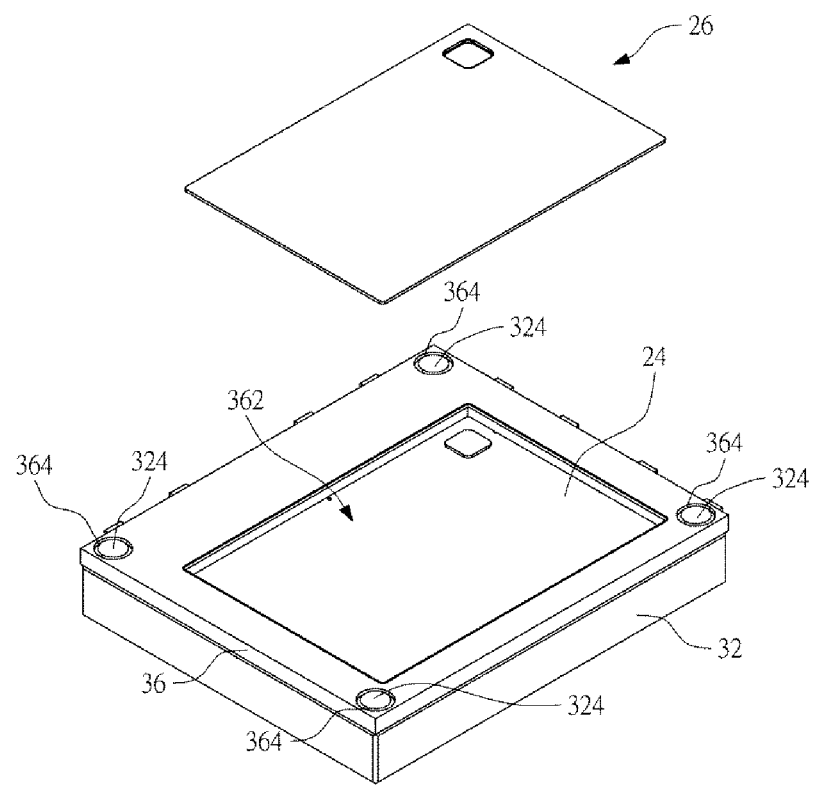

Then, as shown in FIG. 5, the first frame 34 is removed from the base 32, the second frame 36 is disposed on the upper surface 32a, and the touch film 26 is assembled on the circuit board 24 to form the touch module 20.

It is to be noted that directions of the carrier 22, the circuit board 24, and the touch film 26 in FIG. 3 to FIG. 5 are reversed up and down from directions of the carrier 22, the circuit board 24, and the touch film layer 26 in FIG. 1.

Figure 6:
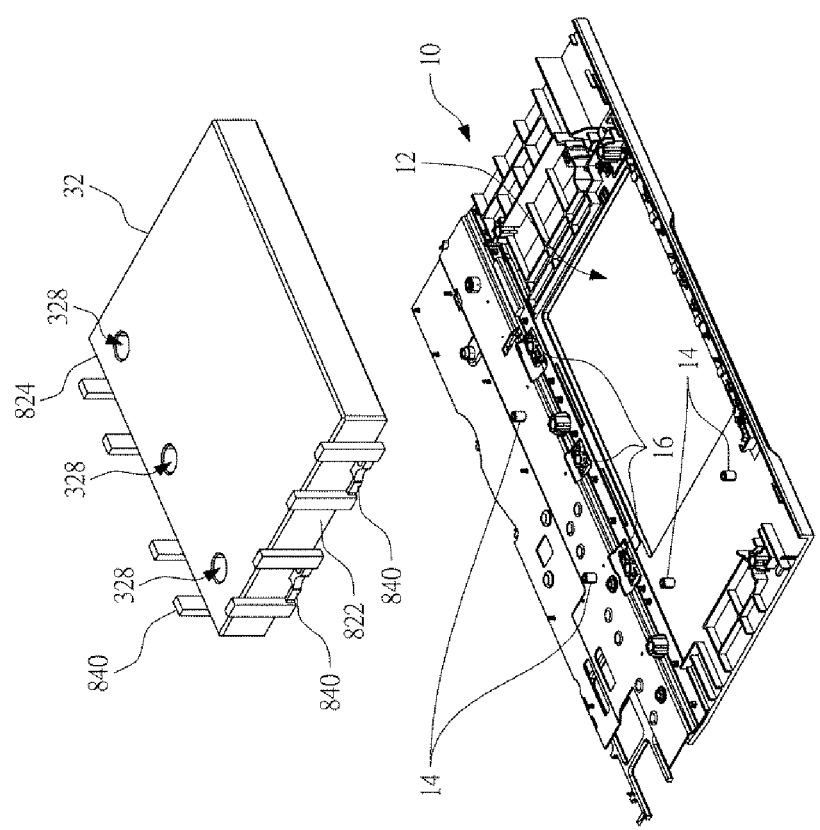
Figure 7:
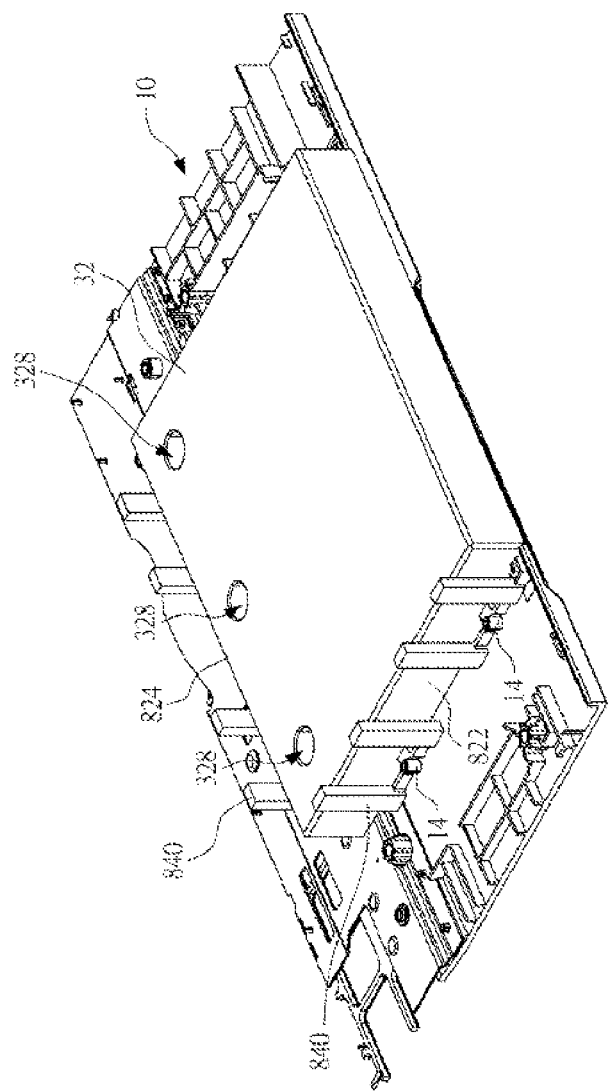

Next, as shown in FIG. 6 and FIG. 7, the second frame 36 is removed from the base 32, the base 32 is moved to the opening 12 along with the touch module 20, and the touch module 20 is positioned at the opening 12. Then, by using the holes 328 on the base 32, the fixing holes 222 on the carrier 22 of the touch module 20 are locked and fixed to the securing elements 16 of the housing 10, to complete processes of assembling the touch module 20 itself and installing the touch module 20 on the housing 10.

Figure 8:
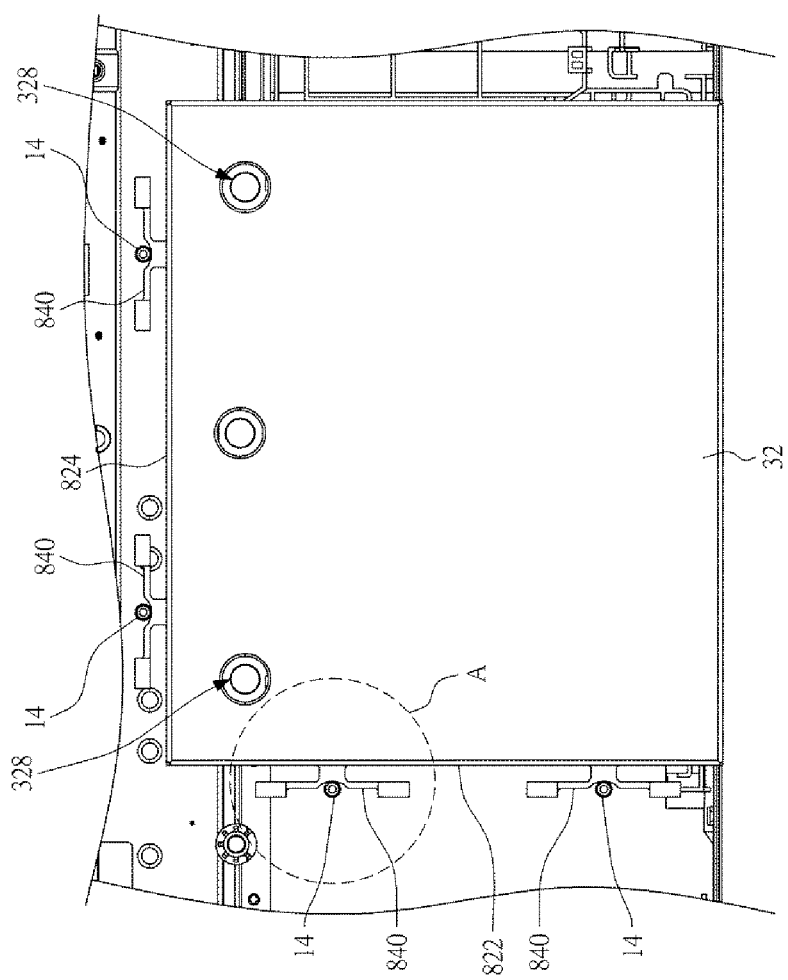
FIG. 8 is a partial top view corresponding to FIG. 7.

Refer to FIG. 7 and FIG. 8 together. FIG. 8 is a partial top view corresponding to FIG. 7. In the assembling process, the base 32 is positioned by using the positioning elements 14 around the opening 12 of the housing 10, and the touch module 20 is fixed to the housing 10 by using the securing elements 16 around the opening 12 of the housing 10.

In an embodiment, the base 32 includes a first side 822 and a second side 824. The first side 822 is perpendicular to the second side 824, and the first side 822 and the second side 824 are abutted against the positioning elements 14, to enable the touch module 20 to be positioned at the opening 12. In an embodiment, the first side 822 and the second side 824 of the base 32 are each provided with two abutting elements 840 for abutting against the positioning elements 14. The abutting elements 840 are configured not only to abut against the positioning elements 14, but also to be clamped by a robot arm or another transport mechanism to move the base 32. However, the disclosure is not limited to thereto. In another embodiment, the abutting elements 840 are provided only on the first side 822 of the base 32, and a quantity of the abutting elements 840 is not limited to two.

Figure 9:
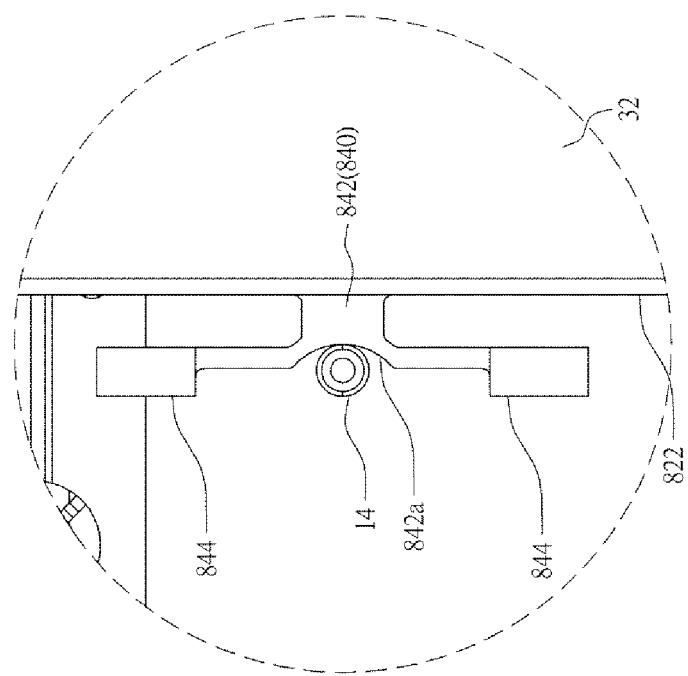
FIG. 9 is an enlarged schematic diagram of an area A in FIG. 8.

Refer to FIG. 9. FIG. 9 is an enlarged schematic diagram of an area A in FIG. 8.

As shown in the figure, each abutting element 840 includes an abutting part 842 and two clamping parts 844. The abutting part 842 extends outward from the first side 822. The abutting part 842 includes an abutting surface 842*a* on a side away from the first side 822 for abutting against each positioning element 14 on the housing 10. The abutting surface 842*a* is arc-shaped to match the positioning element 14. The two clamping parts 844 are disposed on two opposite sides of the abutting part 842 for clamping by a robot arm or another transport mechanism to move the base 32.

It is to be noted that the two clamping parts 844 in the disclosure are disposed on the two opposite sides of the abutting part 842 in a form of a wing-like structure, and a clamping position on each clamping part 844 is disposed at an end of each clamping part 844 away from the abutting part 842. In this way, when the robot arm or another transportation mechanism moves the base 32, the clamping parts 844 itself provide a buffering effect, so that fragile structures such as the positioning elements 14 on the housing 10 and the abutting elements 840 on the base 32 are not damaged during movement.

The mold assembly 30 for assembling the touch module 20 and the assembling method of the touch module 20 by using the mold assembly provided in the disclosure are programs that use the same mold assembly 30 to assemble the touch module 20 and install the touch module 20 in the housing 10. In this way, in addition to effectively reducing an assembly deviation, when the assembly deviation occurs, a reason of the deviation is also effectively determined, to correct the deviation.

The above are only preferred embodiments of the disclosure and do not constitute any limitation on the disclosure. Any person skilled in the art in the art makes any form of equivalent replacement or modification to the technical means and technical content provided in the disclosure without departing from the scope of the technical means in the disclosure that shall not deviate from the technical means of the disclosure and shall fall within the protection scope of the disclosure.

What is claimed is:

1. A mold assembly for assembling a touch module in a housing, wherein the touch module comprises a carrier, a circuit board, and a touch film, the housing comprises an opening corresponding to the touch module, a plurality of positioning elements and a plurality of securing elements is provided around the opening, for positioning and fixing the touch module, and the mold assembly comprises:
   a base, comprising an upper surface, wherein the upper surface comprises a concave corresponding to the carrier;
   a first frame, detachably disposed on the upper surface and comprising a first opening corresponding to the circuit board; and
   a second frame, detachably disposed on the upper surface and comprising a second opening corresponding to the touch film,
   wherein the base comprises a first side and a second side, the first side is perpendicular to the second side, and the first side and the second side are used for abutting against the positioning elements, to enable the touch module to be positioned at the opening;
   wherein an abutting element is disposed on the first side for abutting against the positioning elements;
   wherein the abutting element comprises an abutting part and two clamping parts, the abutting part extends outward from the first side for abutting against the positioning element, and the two clamping parts are disposed on two opposite sides of the abutting part.

2. The mold assembly according to claim 1, wherein the base comprises a plurality of holes, and positions of the holes correspond to the securing elements.

3. The mold assembly according to claim 1, wherein each positioning elements is a positioning column.

4. The mold assembly according to claim 1, wherein a size of the first opening is smaller than a size of the second opening.

5. The mold assembly according to claim 1, wherein a surrounding area of the upper surface comprises a plurality of base positioning elements; the first frame comprises a plurality of first frame positioning elements, respectively corresponding to the base positioning elements, for detachably assembling the first frame on the upper surface; and the second frame comprises a plurality of second frame positioning elements, respectively corresponding to the base positioning elements, for detachably assembling the second frame on the upper surface.

6. The mold assembly according to claim 5, wherein the base positioning elements are positioning columns, and the first frame positioning elements and the second frame positioning elements are all positioning holes.

7. The mold assembly according to claim 1, wherein the carrier comprises a plurality of fixing holes respectively corresponding to the securing elements.

8. The mold assembly according to claim 1, wherein the base comprises an air extraction flow channel, and the air extraction flow channel extends from a side or a lower surface of the base to the concave.

9. An assembling method, for assembling a touch module in a housing, wherein the touch module comprises a carrier, a circuit board, and a touch film, the housing comprises an opening corresponding to the touch module, a plurality of positioning elements and a plurality of securing elements is provided around the opening, for positioning and fixing the touch module, and the assembling method comprises:
   providing a mold assembly, wherein the mold assembly comprises a base, comprising an upper surface, wherein the upper surface comprises a concave corresponding to the carrier; a first frame, detachably disposed on the upper surface and comprising a first opening corresponding to the circuit board; and a second frame, detachably disposed on the upper surface and comprising a second opening corresponding to the touch film;
   placing the carrier in the concave;
   disposing the first frame on the upper surface, and assembling the circuit board on the carrier;
   removing the first frame from the base;
   disposing the second frame on the upper surface, and assembling the touch film on the circuit board to form the touch module;
   removing the second frame from the base;
   moving the base along with the touch module to the opening, and enabling the touch module to face the opening;
   positioning the base by using the positioning elements; and
   fixing the touch module to the housing by using the securing elements.

* * * * *